William W. Odell
Inventor

Patented Jan. 5, 1954

2,665,288

UNITED STATES PATENT OFFICE 2,665,288

PROCESS OF PROMOTING CATALYTIC REACTIONS IN THE VAPOR PHASE

William W. Odell, New York, N. Y., assignor to Standard Oil Development Company

Application September 6, 1949, Serial No. 114,093

2 Claims. (Cl. 260—449.6)

This invention relates to a process of promoting catalytic reactions in the vapor phase. In particular it deals with the reaction of gases, one with another, at reaction temperatures which usually are higher than normal temperatures in the presence of a catalyst adapted to catalyze said reaction. More specifically, the invention includes the contacting of gases and solids while the solids are in a fluidized dense state of suspension in the gas stream while it passes through a reaction chamber. This invention is a continuation in part of application Serial Number 582,692, filed March 14, 1945, now U. S. Patent No. 2,503,291, in which a particular means of promoting chemical reactions was described wherein the catalytic solids were fluidized in a plurality of strata. This invention differs from the latter in that means are provided and methods employed whereby the concentration of one catalyst in a fluidized bed containing a second catalyst is controlled by circulation of the first mentioned catalyst.

In the ordinary practice of fluidized solids technique a gasiform fluid is passed upwardly through a bed of fine size solids at a velocity adapted to fluidize said solids in a reaction chamber. I find that in the promotion of certain types of chemical reactions it is desirable to employ a plurality of catalysts and to accurately control the concentration of one of the catalysts in a mixture of catalysts; satisfactory means of accomplishing this are not in use so far as I am aware.

One of the objects of this invention is to provide a means for employing a bed of mixed catalysts in a reaction chamber in a fluidized state wherein one of the catalysts fluidized is maintained in a predetermined concentration in the fluidized mass even though segregation of the different catalysts occurs continuously in the fluidized mass. Another object is to treat a particular one of a plurality of catalysts employed in substantially a common bed by segregating said particular catalyst, continuously withdrawing it from the bed and recirculating it in the direction of segregation; the catalyst thus withdrawn may be treated for temperature control or for altering the physical and chemical properties of its surface prior to its recirculation. Other objects will become obvious from the disclosures hereinafter made.

In the synthesis of hydrocarbons by reaction of carbon monoxide with hydrogen, more than one chemical reaction usually occurs; in fact, more than one type of reaction occurs. In some cases the reaction products are chiefly carbon dioxide and hydrocarbons and in other cases the products are water and hydrocarbons. Again under certain conditions the reaction combustible products are largely saturated hydrocarbons, whereas under other conditions the combustible reaction products are largely unsaturated. Difficulties have been experienced in that under some conditions an excess of gaseous hydrocarbons are produced, whereas in other cases where gases are the desired end products liquid hydrocarbons and/or waxes are formed. In commercially known processes, in attempting to use a plurality of catalysts in a mixture in a fluidized bed, segregation or classification of the different catalysts occurs. Furthermore, because the segregation is not usually complete under these circumstances, it is not the practice to withdraw from the reactor a particular catalyst and recirculate it. In the production of methane it is known in the art that nickel or nickel aluminum alloys and other materials are particularly catalytic to the formation of this gas. In the production of liquid hydrocarbons it is known that a reduced iron oxide or partly reduced iron oxide is particularly useful as a catalyst for the minimum production of gaseous products. When these catalysts are employed in a substantially common bed it is possible by adjusting the size of the different catalysts in accordance with their specific gravities that there is a marked, in fact, pronounced, segregation of one of the catalysts from the rest of the bed. Thus, finely sized iron type catalysts having a size, for example, in the range 60 to 100 mesh will readily segregate as an upper layer when fluidized with a Raney nickel catalyst (nickel aluminum alloy) when the nickel alloy particles are sized in the range of about $\frac{1}{16}$ to $\frac{1}{8}$ inch in diameter. When the thus segregated iron type catalyst is withdrawn from the upper layer of the bed, fluidized and confined in a reactor, it may be circulated upwardly through the bed of nickel catalyst by introducing it at substantially the bottom of said bed at a predetermined rate. It will be noted that the rate of supply of the iron type catalyst to the bottom of the bed of the nickel catalyst is a controlling means for governing the concentration of the iron catalyst in the mixed bed. By controlling the concentration of the iron catalyst in the mixture in the bed it is possible to regulate the relative quantities of liquid and gaseous hydrocarbons produced. Although various combinations of catalysts may be employed in the practice of this invention it is of particular importance to note that in the combination of iron and nickel types of catalysts another unexpected result is obtained. In making chiefly gaseous hydrocarbons and employing a mass-preponderance of nickel in the fluidized bed and circulating the iron catalyst upwardly continuously through the fluidized mass confined in a suitable reactor at a temperature in the range of 200° to 350° C. not only is methane produced but the other hydrocarbons of relatively low molecular weight having 2 to 5 carbon atoms in the molecule are formed with very small amounts of hydrocarbons of greater molecular weight. This is a unique and desirable result when chiefly hydrocarbons in this range are the desired end products. This result is obtainable when the concentration of iron catalyst dispersed in the fluidized nickel catalyst is of the order of 5 to 60 per cent, but preferably in the range of 10 to 40 per cent. Variations in the amounts, activities, temperature, pressure, and size of the catalysts influence final results and these variations can be made within the scope of this invention by one skilled in the art and the desired results may be obtained under control.

Changing the ratio of hydrogen to carbon monoxide in the gaseous mixture, supplied both as reactant materials and as the fluidizing agent to the reactor, has an influence on the type of reaction occurring which is known in the art. Two different types of reactions are presented in Equations 1 and 2, as examples, in the production of pentane:

(1)       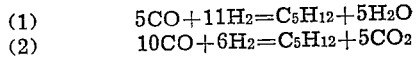
$$5CO + 11H_2 = C_5H_{12} + 5H_2O$$
(2)       $$10CO + 6H_2 = C_5H_{12} + 5CO_2$$

A higher hydrogen to carbon monoxide ratio favors the production of maximum amounts of water vapor as indicated by Equation 1, whereas a lower ratio favors the production of carbon dioxide as indicated by Equation 2. Olefins also are formed by similar reactions which are exemplified by Equations 3 and 4 as follows:

(3)       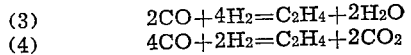
$$2CO + 4H_2 = C_2H_4 + 2H_2O$$
(4)       $$4CO + 2H_2 = C_2H_4 + 2CO_2$$

The nickel type catalyst favors the production of paraffin series hydrocarbons particularly methane whereas highly reduced iron type catalysts favor the production of olefins. High CO to $H_2$ ratios in the reactant stream also favor the production of olefins in hydrocarbon synthesis reactions.

The invention can best be described with reference to the figures.

Figure 1:
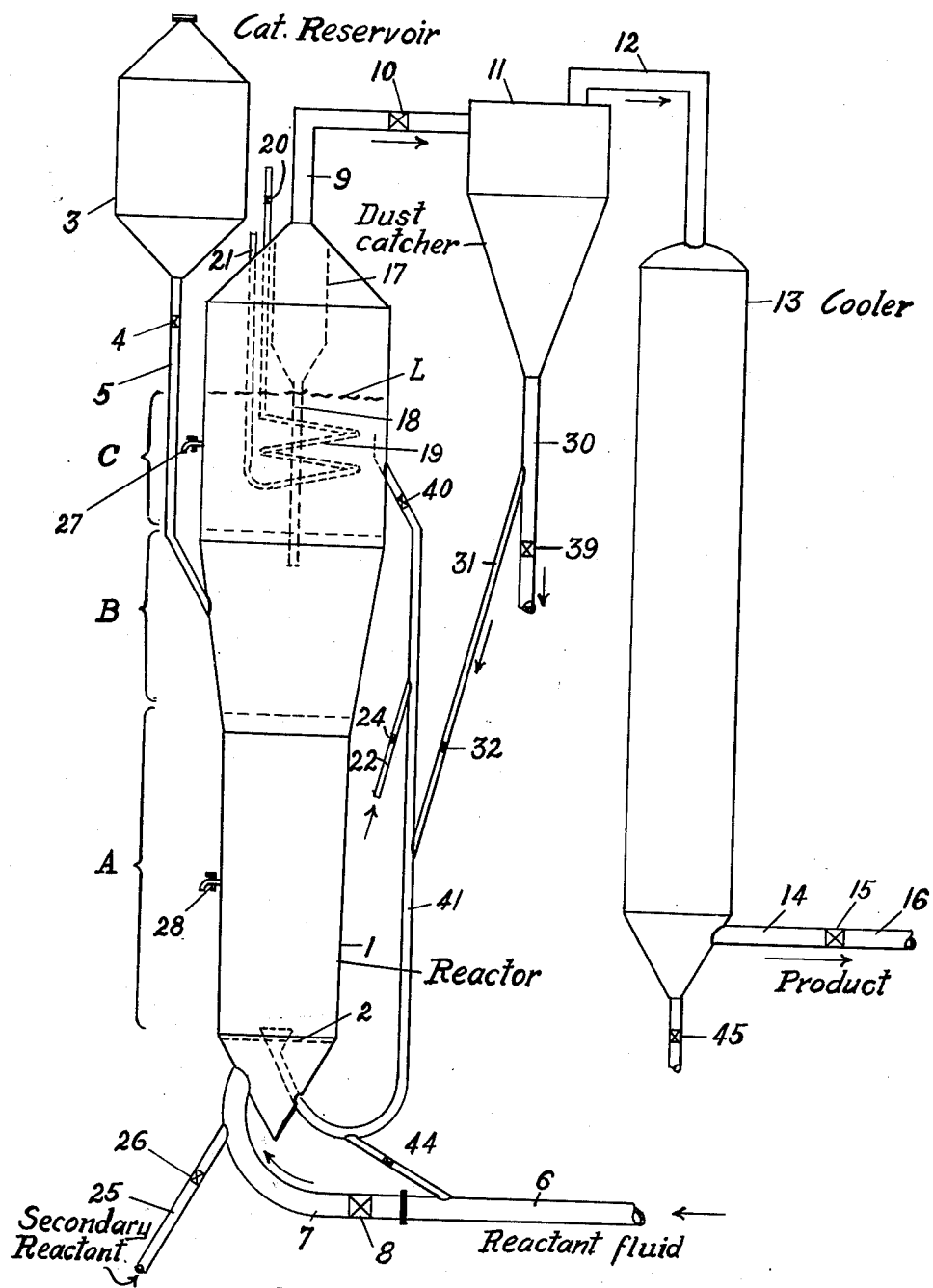
Figure 1 shows diagrammatically in elevation, but largely as a flow scheme, one form of apparatus in which the invention may be practiced; it shows in particular a reactor suitably connected for recirculation of a catalyst from and back to a stratified densely fluidized bed of solids which bed is confined in said reactor.

Referring to Figure 1, the reactor 1 has a porous member or grid 2, reservoir 3 for supplying catalyst thereto through valve 4 and conduit 5, a main supply line 6 for supplying gasiform reactants thereto through conduit 7 and valve 8, an offtake 9 for fluid reactants with control valve 10 leading to dust separator 11 from which offtake 12 connects with cooler 13, offtake 14, valve 15 and conduit 16 which conducts gasiform reaction products to known means for recovering the latter products. Member 17 in the top portion of reactor 1 collects considerable of the catalyst initially entrained in the gasiform stream of reaction products passing up out of the fluidized bed in 1 and returns it to a lower zone or stratum of the bed through leg 18. Means for cooling the solids in the top stratum C of the catalyst bed, shown at 19, is supplied with coolant fluid through valve 20; the latter fluid is discharged through conduit 21. Catalyst or other solids concentrating in the bottom stratum A may be withdrawn from the latter stratum and circulated to the top stratum C by closing, or almost closing, valve 44 and supplying a gasiform propellant from conduit 22 through valve 24 and opening valve 40. Thus the fluidized solids may be circulated from top zone to the bottom zone of the fluidized bed or vice versa. The means of cooling the solids and fluid stream, 19, 20, and 21 were shown in my copending case referred to above as Serial No. 582,692 but means were not shown therein for the circulation of the thus cooled solids back to a lower zone of the bed. Catalyst withdrawn from the top zone of the bed passes through valve 40, and conduit 41 back to the bottom zone of the bed partly by virtue of the impelling force of gasiform fluid passing in controlled amounts through valve 44. The fine size catalyst recovered in 11 passes down through conduit 30 and may be discharged in controlled amounts through valve 39 or may pass from 30 into conduit 31 and pass through valve 32 into conduit 41 and back into reactor 1. The bed in 1 is stratified in zones designated A, B, and C. The least buoyant solids, which may be catalytic solids, are confined in concentration in zone A, the most buoyant solids, which also may be catalysts of the same or a different kind, are concentrated in zone C, whereas zone B comprises chiefly a mixture of the two kinds of solids in process of classification i. e. separation. Valve 45 permits withdrawal of condensate or dust or both from cooler 13.

Figure 2:
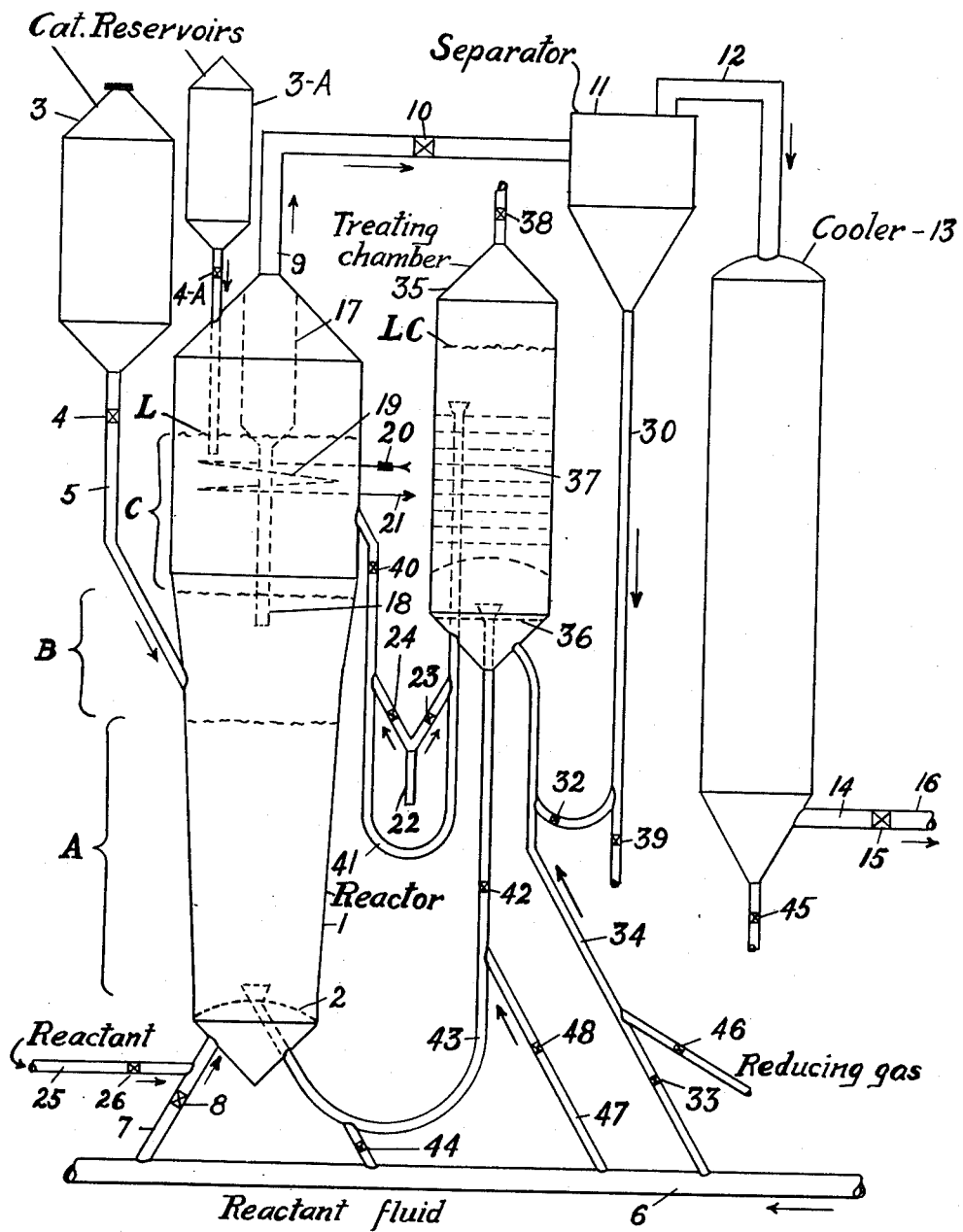
Figure 2 shows similarly diagrammatically another form of apparatus in which the invention may be practiced and in which the circulating catalyst may be gas-treated before it is returned to the reactor.

In the Figure 2 the same system of numbering is employed except with reference to the new parts not shown in Figure 1. In this figure the solids withdrawn from zone C through valve 40 pass through conduit 41 to the treating chamber 35 wherein they are maintained in a fluidized state by means of a reducing gas entering 35 from conduit 34; the control valves for the reducing gas, 33 and 46, control respectively the supply of synthesis gas or other reducing gas such as hydrogen. The reducing gases supplied to 35 pass upwardly through grid 36 and a mass of regularly spaced and arranged checker bricks 37 and is discharged through offtake valve 38. The solids collecting in separator 11 pass through conduit 30 and may be withdrawn therefrom in whole or in part through valve 39 or they may pass through conduit 31, valve 32, and conduit 34 into the treating chamber. The treated and cooled solids pass substantially continuously down out of chamber 35 through valve 42 and conduit 43 to the bottom stratum A of reactor 1. Gas admitted to conduit 43 through valve 44 is the propelling force which causes the solids to circulate from 43 up into reactor 1. When it is desirable to circulate solids in the opposite direction, namely to withdraw them from zone A and return them to zone C of reactor 1, valve 44 is closed and valve 43 is opened allowing gas to pass from conduit 47 to conduit 43, valve 42 is opened and the solids are transferred through conduit 41 and valve 40 to zone C of reactor 1 and the propelling force is a gasiform fluid supplied to conduit 40 from conduit 22 by opening valve 24.

The reducing gas passing through valve 46 into conduit 34 is preferably, usually, a cool gas when promoting exothermic reactions such as the synthesis of hydrocarbons.

Before presenting examples attention is called to the fact that quite definite conditions must obtain for segregation to occur and stratification to take place in the desired manner. The velocity of the fluid stream initially containing reactant materials which stream is the fluidizing agent must be sufficient to fluidize the largest size or the least buoyant solids even if they were confined alone free of the smaller or more buoyant solids. There must be an appreciable difference in buoyancy of the solids fluidized so that the most buoyant solids substantially travel upwardly through the bed of the least buoyant solids. Or, expressed differently, the least buoyant solids have an appreciably greater settling rate than the most buoyant solids. When air, for example, is blown up through a bed containing a mass of solids of mixed sizes, the mixture becomes densely fluidized when the air velocity is sufficient and very little segregation occurs. As the air velocity is increased the most buoyant solids tend to become increasingly entrained in the air stream and more of them pass through and out of the bed in the latter stream. Now, if there is a marked difference in the buoyancies of, say, two different kinds of solids and the velocity of the air stream is great enough, the least buoyant solids form a bottom stratum above which is, usually, a mixed layer or stratum and above that a stratum in which the most buoyant solids are highly concentrated. When a straight-wall vessel, such as a vertical cylindrical chamber, is used to confine the thus fluidized bed the velocity of the air will be excessive in the top layer of solids (the most buoyant solids) for their satisfactory fluidization with the result that considerable entrainment of solids occurs. The entrained solids can be removed from the air stream and returned to the bed but a more satisfactory procedure is to employ a chamber with an expanded portion in this upper region thereof whereby the linear velocity of the air is decreased; this permits better fluidization of the most buoyant solids in the top zone of the bed with less entrainment. When a reactant fluid is employed instead of air a change in gas volume usually occurs as the fluid passes through the bed and when this change is a volume decrease the need for an upwardly flaring reactor is less essential whereas when the fluid volume increases an expanded top portion is most essential.

The stratification is promoted by employing solids of one buoyancy substantially uniformly sized and solids of a different buoyancy uniformly sized but preferably of a different size. It is preferred that the least buoyant solids be larger than those of the most buoyant solids. It is also preferred that the solids of least buoyancy have a greater specific gravity than the most buoyant solids. The depth of the intermediate zone B of the figures is greater when the difference in density and size of the two kinds of solids is small and it is small when the different kinds of solids have appreciably different size and density.

In promoting catalytic reactions it is desirable to consider the kind of catalyst to be used in zones A and C of the figures but also the relative amounts of each and the relative size of each and the rate of recirculation of catalyst from zone A to C or from zone C to A. The rate of segregation of very small size particles is low whereas the rate for large size particles is higher; likewise the segregation rate is higher for dense than for low-density solids. The phenomenon which appears to take place in promoting the desired segregation is as follows: Referring to Figure 1 the velocity of the gasiform reactant stream passing up from conduit 7, through valve 6 and grid 2, is sufficiently high in zone A that the large dense solids therein are completely fluidized; this velocity is so high that the smaller and less dense solids can not long remain in zone A. In effect the most buoyant solids are blown out of the bottom zone A. With reaction occurring in the stream which causes a decrease in volume of the stream as it passes upwardly the result is a decrease in fluid velocity through the upper zone C of the fluidized bed which is most desirable; this velocity is further decreased by virtue of the expanded sectional area of reactor 1 in the upper zone thereof. When very deep beds are employed in A and C formation of slugs in the bed in C is apt to occur unless the diameter is about as great as the depth of C. It is usually preferable to use more of the large dense solids of zone A than of the solids in zone C thus obtaining a deep zone A and a shallower zone C. When the most buoyant solids are returned to A from C through valve 40 and conduit 41 the first effect observed is an improvement in fluidization in zone A. Furthermore the rate of segregation apparently is not the same for all concentrations of the solids of one buoyancy from those of another buoyancy in a mixture, other variables remaining unchanged. The rate is greater for very high concentrations of the most buoyant solids, or very low concentrations, in the fluidized mass of the least buoyant solids. In the range of about 7 to 35 percent of the most buoyant solids in the mixture the rate of segregation appears to be less than at higher or lower concentrations. This is a favorable range for promoting chemical reactions because less recirculation is required to maintain a constant predetermined concentration ratio in the fluidized bed, particularly in zone A of the figures. Higher or lower concentrations of the most buoyant particles in zone A can be maintained by adjusting the velocity of the fluidizing stream in synchronism with the rate of recirculation of the most buoyant particles from zone C to zone A. The smaller the size and lower the density of the most buoyant solids relative to the size and density of the least buoyant solids, the greater the rate of segregation, other factors remaining the same. In order to obtain optimum results the relative concentrations of the chosen catalysts or other solids in zone A of the figures should be held constant in the range found to be best suited for promoting a particular reaction; this is accomplished by circulating solids from zone C to zone A at a rate sufficient to provide the desired concentrations or ratio and thereafter circulating said solids at a rate about equal to the segregation rate. I find that the viscosity of the fluidized bed decreases rapidly when fine size solids are introduced into a fluidized bed of coarsely sized solids; the first ten per cent of fines sometimes reduces viscosity 30 to 50 percent whereas above 50 percent fines the rate of viscosity reduction is much less with increments of fines. Any chosen concentration of fine-size solids in a fluidized bed of coarse solids can be maintained by first establishing the desired concentration and then circulating the fines (supplying fines to the bed of coarse solids) at a rate substantially equal to the segregation rate. A lower rate than segregation may be employed but not a higher rate, for the maintenance of the stratified bed. It is normally preferable to circulate the buoyant solids up through the bed of less buoyant solids as from zone C through 40 and 41 to zone A of Figure 1, because of the greater ease of handling and dispersing the finer size solids; however, attention is called to the fact that when the least buoyant solids are circulated, namely supplied to zone C and removed from A and recirculated back to zone C again, there is a very appreciable decrease in the amount of the most buoyant solids entrained in the gas stream passing up out of the fluidized bed. When this latter procedure is followed the large and/or dense solids recirculated may be inert, catalyst of low activity or regular catalyst. If inert solids are thus used the stream of reactant gas supplied from 6 through 7 and 8 may be cool, the inert solids supply heat to the gas stream and are themselves cooled before they pass out of reactor 1, and in a cooled state they are recirculated to the hotter zone C when exothermic reactions are promoted in the gas stream.

Although there is not a limit on the pressure that may be employed in promoting chemical reactions practicing this invention, computations indicate that the economical upper limit is about 68 atmospheres; the lower limit is that required to provide the desired and necessary fluidization which, for a deep bed, will approximate 1 atmosphere gage.

Temperatures are maintained in the fluidized bed according to the reactions promoted, the nature of the catalyst used and the pressure employed. Nickel, in the presence of CO at high pressure forms nickel carbonyl which passes out of the reactor as a gas or vapor. In making synthetic hydrocarbons from CO and $H_2$ serious "carbon difficulties" normally arise as the temperature is increased over about 750° F., that is, carbon deposits on the catalyst, whereas at temperatures below 350° F. the reaction rate is low for most catalysts unless high pressures are employed. Under certain conditions making methane, temperatures as high as 1400° F. may be employed. Promoting strongly exothermic reactions in the lower temperature range cooling is necessary and this may be accomplished by the cooling means 19, 20 and 21 of the figures or by supplying a cooling fluid to 35 through 46 of Figure 2. Other means of cooling have been described in the case of which this is a continuation in part but are not per se shown in the figures since they are not a part of this invention. Should it be necessary to supply heat to the bed combustion reactions may be promoted in the bed by introducing a combustion supporting fluid and a fuel through conduit 25 and valve 26 of the figures. For the purpose of this invention the maximum temperatures that may be employed are limited by the range in which small solids can be fluidized and is about 2000° F. Such a temperature is useful in re-forming hydrocarbons.

The velocities employed in the practice of fluidized solids technique is well understood but in the practice of this invention higher than normal velocities are employed. For example, in fluidizing smooth, substantially uniformly sized solids having a specific gravity of, say, 5.3 which solids have a mean diameter of $\frac{3}{32}$-inch a superficial velocity of 0.9 to 1.0 foot per second will fluidize them sufficient for some operations but not sufficient to allow buoyant particles to be segregated therefrom in a mixture. A velocity of 2 to 4 feet per second or higher is desired for promoting segregation and the less the difference in buoyancy and/or size the higher the velocity requirements. Means for drawing off samples to determine the degree of segregation occurring are shown in the figures at 27 and 28; their use is helpful in making final adjustments of stream flow rates.

In most cases it is desirable to employ coarse solids as the least buoyant material sized up to about $\frac{1}{8}$ or $\frac{3}{8}$ inch mean diameter and it is usually desirable to use as the most buoyant material solids of a much smaller size the maximum usually being $\frac{3}{32}$-inch, but varying with specific gravity. Coarse particles having a specific gravity of 5.0 and sized $\frac{3}{32}$-inch in diameter are readily segregated from solids having a specific gravity of 3.0, sized 80 to 100 mesh. It will be noted that 0.3-foot per second superficial velocity is sufficient to fluidize the latter solids by themselves, hence the high velocities are not desired in the top zone C of the figures. In making methane from CO and $H_2$ the maximum volume change at constant temperature and pressure is 2 to 1 and a part of this benefit is offset by a difference in pressure in the reactor when operating at relatively low pressures of 1 to 2 atmospheres. Hence, for high conversion rates, it is desirable to minimize entrainment by flaring the upper portion of the reactor. However, when high circulation rates (solids circulation) are not required the minimum difference in buoyancy of the different solids should be employed which will permit the required segregation; this minimizes entrainment of the most buoyant solids in the gas stream. The recirculation rate is limited only by the rate of segregation. However, the recirculation rate may be such that the top stratum C of the figures is very shallow. Under these conditions only a small portion of the reactor need be expanded in the top zone.

The checker bricks in chamber 35 of Figure 2 are preferably arranged in flue formation and the solids having a level LC therein are maintained in a fluidized state by the fluid stream passing up through conduit 34 into the zone beneath grid 36. The bricks should preferably afford space channels of 2 to 3 inches.

The depth of the strata, A and B, may be chosen to suit conditions. If a relatively long time of contact is desired a deep bed is employed, whereas when reactions have occurred sufficiently for the purpose after the stream passes up through a relatively shallow bed there is no need for a deeper one. For the purpose of clearness it may be said that the depth of stratum A may be in the range 10 to 20 feet for many reactions and stratum C may be 3 to 10 feet deep. These depths are not limits. The catalytic activity of the solids of the different buoyancies have considerable bearing on the choice of depths. Also, because small particles offer larger surface than large ones per unit of mass the size of the catalyst particles influences choice of bed depth as well as the relative amounts of the different solids used.

Example 1

Production of hydrocarbons by reactions of CO with $H_2$. Referring to Figure 1, a synthesis gas comprising 60 per cent $H_2$ and 32 per cent CO is introduced at 50 pounds' pressure into reactor 1 from 6 and 7 by opening valve 8, after a bed of mixed catalysts has been established therein. The bed depth is built up to level L by introducing the catalysts from reservoir 3 through valve 4 at a temperature sufficient to initiate reactions, about 350° F. The coarse catalyst in this example comprises a partially reduced iron oxide sized about ⅛-inch mean diameter; the most buoyant solids are sized about 100 mesh and comprise a partially reduced iron oxide initially containing relatively small amounts of copper and an alkali. The copper content may be 0.5 to 5.0 per cent and the alkali, which may be potassium carbonate may be about 1.0 per cent calculated as $K_2O$. The depth of stratum A is 20 feet and the quantity of the fine size catalyst used is sufficient to provide a layer (stratum) of it about 3 feet deep in C. The superficial velocity of the gas stream in zone A is 4.0 to 5.0 feet per second. The area of the zone C is preferably at least twice that of zone A, that is, if the diameter of the bed in zone A is 3 feet the diameter in zone C preferably should be 12 feet. The final adjustment of the flow of the synthesis gas is made by taking samples of the solids from sample cocks 27 and 28. One skilled in the art can make the adjustment by the use of differential pressure gages, measuring the difference in pressure over a given height of C for example indicates bed density which is greater for mixed solids than for the fine sizes above at a given stream velocity. Valve 40 is opened and some synthesis gas is passed into 61 through valve 44 to conduct the solids from C back to the reactor. The rate of this recirculation is controlled so as not to exceed the segregation rate. For higher recirculation rates higher stream velocities are employed.

The products of reaction are removed from above the bed through 17, offtake 9, valve 10, dust separator 11, conduit 12, condenser 13, conduit 14 and valve 15 and is conducted to a known means for handling gases and recovering products therefrom. Accumulations of fine size catalyst in separator 11 is returned to 1 through conduit 30, 31 and valve 32 except as it is desirable to withdraw it for reactivation, it is then withdrawn through valve 39. Cooling fluid is introduced into cooling member 19 through valve 20 and is discharged through conduit 21. This prevents the fine-size catalyst from becoming overheated. When the operation is well under way the synthesis gas supplied through valves 8 and 44 may be appreciably below reaction temperature in as much as the large solids are in a measure heat conductors. The temperature throughout the bed in this example should be in the range 650° to 300° F., that is, the maximum temperature should be about 650° F. and the minimum 300° F.

The products and operating results, proceeding as outlined above are substantially as follows:

| | |
|---|---|
| CO plus $H_2$ converted, percent | 70.0 |
| Yields per 1,000 cu. ft. of the synthesis gas: | |
|   Gaseous products free of $CO_2$ and $H_2O$, cu. ft. | 407 |
|   Liquid products, gals | 0.12 |
| B. t. u. of the gas free of $CO_2$, per cu. ft. | 633 |

Still referring to Figure 1, when additional amounts of the fine-size catalyst is needed to maintain both the bed level and the selected proportion of the different catalysts in the bed, it is supplied from reservoir 3-A by opening valve 4-A of Figure 1. It will be seen that by employing very high velocities of flow of the fluids through the catalyst bed such that large quantities of the fine-size catalyst is carried over into the separator 11, the recirculation of the latter catalyst may comprise substantially its return from 11 through 30, 31, 32 and 41 to zone A in reactor 1; under this circumstance very little catalyst need be circulated through valve 40.

By the proper selection of catalysts, operating pressure and temperature as well as gas velocity through the catalyst bed it is possible to produce more or less liquid products or to make a gas only without liquid products. In attempting to make gas comprised essentially of methane, ethane and ethylene one may employ a nickel-type catalyst with a very low concentration of an iron-type catalyst dispersed in said fluidized nickel catalyst or a nickel-iron-aluminum alloy containing a small percent of iron may be employed. High temperatures in the bed, in general, favor gas production at the expense of liquid products. One difficulty experienced in previous attempts to operate at temperatures above 600° F. has been the formation of carbon and its adhesion to the catalyst reducing its activity; one reversible reaction illustrating this is shown in Equation 5. The reversible reactions

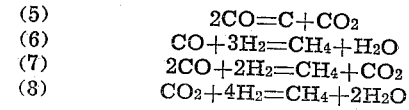

$$(5) \quad 2CO = C + CO_2$$
$$(6) \quad CO + 3H_2 = CH_4 + H_2O$$
$$(7) \quad 2CO + 2H_2 = CH_4 + CO_2$$
$$(8) \quad CO_2 + 4H_2 = CH_4 + 2H_2O$$

typifying methane production are indicated by Equations 6, 7 and 8. Now, at high temperatures reactions of Equations 6, 7 and 8 occur from right to left, 1,800° F. being a favorable temperature at about atmospheric pressure, hence in conducting reactions favoring methane production it is necessary to avoid high temperatures although increasing the operating pressure helps to offset the effect of temperature. In other words a higher conversion of CO to $CH_4$ can be obtained under pressure of say 500 pound per square inch than at the same temperature and 15 pounds' gage pressure. I find that in promoting Reactions 6 and 7 left to right the accumulation of $CO_2$ and $H_2O$ in the product, along with the $CH_4$ so alters equilibria conditions that the rate of conversion to $CH_4$ decreases as the stream initially containing the reactants $H_2$ and CO passes up through the catalyst bed. The $CO_2$ and $H_2O$ react with an iron catalyst oxidizing metallic iron to a non-metallic form, usually to a magnetic oxide; hence in commercial practice in the synthesis of liquid hydrocarbons it is the custom to regenerate the catalyst by separately treating it with a reducing gas periodically.

It is well known that in promoting chemical reactions in a gasiform fluid by passing it upwardly through a confined bed of catalytic, fine-size solids at a fluidizing velocity the ebullient motion in the bed is such that the reactant fluid fed to the bed in contacting these solids immediately mixes with vaporous reaction products which is a condition not desirable for maximum conversion. The introduction of the reactant fluid in a plurality of separate, upwardly directed streams, as shown in Serial No. 582,692 referred to above, helps to avoid this condition which is further improved by employing a mass of checker bricks in zone A or in zones A and B of the figures, so spaced and arranged that they form regular channels in which the catalyst solids are fluidized; the mean diameter of these channels is of the order of 2 to 3 inches. When checker bricks are thus employed the stream velocity in the top zone C which is free of the checker bricks is automatically decreased, which is a desired condition, and complete top to bottom mixing of the reactants and products in the fluidized bed is avoided.

Another application of this invention is the production of city gas having a calorific value of the order of 480 to 600 B. t. u. on the $CO_2$ free basis, which comprises passing superheated steam and a gas containing appreciable amounts of CO and $H_2$ up through a bed of catalyst confined in a reactor while circulating reactive carbon, or low temperature coke, up through the catalyst bed. The temperature of the superheated steam should be below 1,800° F. and preferably 800° to 1,650° F. and the carbon circulation rate should be such that the concentration of carbon in the catalyst bed is of the order of 20 to 80 percent. The catalyst may be of the iron type, preferably sized 1/64 to 1/8-inch and the size of the solid fuel is of the same order or finer. The concentration of steam in the mixture of steam, CO and $H_2$ is preferably 20 to 65 percent and the velocity of flow of the mixture is that required to maintain suitable fluidization whereby stratification occurs as described. Referring to Figure 2 the catalyst is confined largely in zones A and B, and the region A of reactor 1 is preferably filled with spaced and arranged checker bricks. In this example carbon is consumed by reaction with steam and with $H_2$, while CO and $H_2$ react to form methane. The pressure should be superatmospheric, 200 to 600 pounds' gage is preferred. Ash is withdrawn through valve 29. The temperature in the bed should be below 1,800° F. and above 1,300° F. In this example the solid fuel fed to the reactor from reservoir 3 and fresh catalyst is supplied from 3–A. The operation is continuous.

When the synthesis gas contains $H_2S$ or organic sulfur compounds in amounts which rapidly poison a reduced nickel catalyst or a nickel alloy, one may use as a catalyst a nickel sulfide made by reducing nickel sulfate supported on a carrier by hydrogen or by carbon and a reducing gas at about 300° to 350° C. This sulfide, believed to be $Ni_3S_2$ is not poisoned by sulfur gases and retains its activity in promoting hydrocarbon synthesis over an extended period of time when the sulfur content of the gas has a partial pressure of about 2 mm. at atmospheric pressure. This sulfur content can be maintained by introducing a small amount of the $H_2S$ initially removed from the synthesis gas during its purification.

Another application of the invention lies in the partial or incomplete oxidation of hydrocarbons and the like in the vapor phase supplying the oxygen by a metal oxygen compound. Equations typifying this are shown as follows:

(9) 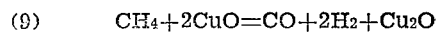 $CH_4 + 2CuO = CO + 2H_2 + Cu_2O$
(10) 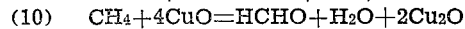 $CH_4 + 4CuO = HCHO + H_2O + 2Cu_2O$
(11) 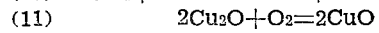 $2Cu_2O + O_2 = 2CuO$ Reactions 9 and 10 may be promoted in reactor 1 of Figure 2 employing a circulating catalyst such for example as CuO. The fluidized bed in zone C may comprise alumina, silica, or other refractory solids and the CuO passes through the bed preferably downwardly. The revivification of the catalyst as shown in Equation 11 may be accomplished by air blowing the bed in treater 35. In this instance air instead of reducing gas passes through valve 46 and conduit 34 and the temperature in 35 is maintained above 300° C. but below sintering temperature. It is sometimes necessary to employ as the regenerating fluid a gas containing less $O_2$ than air. The catalyst CuO in this example is also a reactant. The temperature in reactor 1 is controlled to obtain the optimum yields of the desired products but must be below the melting or agglutinating temperature of the catalyst.

It is believed to be basically new to fluidize a plurality of different kinds of small size solids of different buoyancy and catalytic properties in stratified layers in a bed in a reactor and to continuously circulate solids from one stratum thereof, comprised essentially of particles of buoyancy X, to and through a different stratum thereof comprised largely of particles of different buoyancy Y and different catalytic properties, while promoting chemical reactions in the fluidizing stream as it passes through said bed.

Having described my invention so that one skilled in the art can practice it without limitation to particular examples presented herein, I claim:

1. The process of promoting chemical reactions in a gasiform fluid stream, in contact with solid surfaces, comprising passing said stream, initially containing at least one gasiform reactant adapted to react chemically at elevated temperatures, upwardly through a deep, pervious mass of a plurality of different kinds of solids in a granular state in predetermined proportions having considerably different buoyancies A and B in said stream, while they are so confined in a reaction chamber that the bottom zone of said mass has a small diameter, the top zone thereof has a relatively large diameter and the intermediate zone tapers downwardly and while they are at a favorable reaction temperature and under favorable pressure for said reactant to react chemically, at such a velocity that said solids are fluidized as a deep, dense, continuous bed in said chamber in said zones in stratified dense layers whereby said bottom zone is comprised largely of solids A of low buoyancy, said top zone is comprised largely of solids B of relatively high buoyancy and said intermediate zone is comprised of a mixture of solids A and B, thereby promoting chemical reaction of said reactant as said stream passes serially through the different zones with decreasing stream-mass velocity, and removing the gasiform reaction products in said stream from above said bed.

2. The process of promoting chemical reactions by contacting a gasiform fluid stream initially containing the reactants CO and $H_2$ with a mass of small-size solids while said solids are confined in a reactor, comprising, fluidizing said mass as a deep, dense, continuous bed in said reactor, which mass comprises essentially 2 different catalysts A and B each adapted to catalyze the reaction of CO with $H_2$ to form hydrocarbons, A being a nickel type catalyst whose particles are in the approximate size range 1/16 to 1/8-inch in diameter, B being an iron type catalyst whose particles are in the approximate size range 60 to 100 mesh, by passing said stream upwardly through said bed at a high superficial velocity, maintaining a high fluid-mass velocity of said stream through the bottom zone of said bed while maintaining a relatively low fluid-mass velocity of said stream through the top zone of said bed whereby the particles of A and B catalysts are so segregated in stratified densely fluidized layers in said bed that said bottom zone is comprised largely of said A particles and said top zone is comprised largely of said B particles, thereby promoting said reactions in said stream as it passes upwardly through the bed serially through the different strata, at decreasing mass velocity, removing the reaction products in said stream, withdrawing B particles from said top zone and feeding them into said bottom zone at a rate adapted to provide a chosen concentration of the latter particles in the latter zone within the range 5 to 50 per cent.

WILLIAM W. ODELL.

References Cited in the file of this patent
UNITED STATES PATENTS

| Number | Name | Date |
| --- | --- | --- |
| 1,355,105 | Canon | Oct. 5, 1920 |
| 2,325,611 | Keranen | Aug. 3, 1943 |
| 2,360,787 | Murphree | Oct. 17, 1944 |
| 2,373,008 | Becker | Apr. 3, 1945 |
| 2,379,711 | Hemminger | July 3, 1945 |
| 2,414,276 | Sensel | Jan. 14, 1947 |
| 2,417,164 | Huber, Jr. | Mar. 11, 1947 |
| 2,421,212 | Medlin | May 27, 1947 |
| 2,446,247 | Scheineman | Aug. 3, 1948 |
| 2,450,500 | Clark | Oct. 5, 1948 |
| 2,453,740 | Becker | Nov. 16, 1948 |
| 2,453,874 | Sweetser | Nov. 16, 1948 |
| 2,463,912 | Scharmann | Mar. 8, 1949 |
| 2,468,521 | Sweetser et al. | Apr. 26, 1949 |
| 2,483,485 | Barr | Oct. 4, 1949 |
| 2,503,291 | Odell | Apr. 11, 1950 |